United States Patent
Franke et al.

(10) Patent No.: US 9,042,639 B2
(45) Date of Patent: May 26, 2015

(54) METHOD FOR REPRESENTING SURROUNDINGS

(75) Inventors: Uwe Franke, Uhingen (DE); David Pfeiffer, Boeblingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/237,590

(22) PCT Filed: Jul. 21, 2012

(86) PCT No.: PCT/EP2012/003091
§ 371 (c)(1),
(2), (4) Date: Feb. 7, 2014

(87) PCT Pub. No.: WO2013/029722
PCT Pub. Date: Mar. 7, 2013

(65) Prior Publication Data
US 2014/0205184 A1    Jul. 24, 2014

(30) Foreign Application Priority Data
Aug. 30, 2011  (DE) .................. 10 2011 111 440

(51) Int. Cl.
*G06K 9/00* (2006.01)
*G06T 7/00* (2006.01)

(52) U.S. Cl.
CPC .......... *G06K 9/00201* (2013.01); *G06T 7/0075* (2013.01); *G06K 9/00805* (2013.01)

(58) Field of Classification Search
CPC .... G06K 9/00805; G06K 9/9476; G06K 9/62
See application file for complete search history.

(56) References Cited

U.S. PATENT DOCUMENTS

| | | | |
|---|---|---|---|
| 8,548,229 B2 * | 10/2013 | Badino et al. | 382/154 |
| 2009/0297036 A1 | 12/2009 | Badino et al. | |
| 2011/0311108 A1 * | 12/2011 | Badino et al. | 382/106 |

FOREIGN PATENT DOCUMENTS

| | | |
|---|---|---|
| DE | 102005008131 A1 | 8/2006 |
| DE | 102009009047 A1 | 8/2010 |
| WO | 2010091818 A2 | 8/2010 |

OTHER PUBLICATIONS (Nicholas Soquet, "Road Segmentation Supervised by an Extended V-Disparity Algorithm for Autonomous Navigation", Intelligent Vehicles Symposium, 2007 IEEE).*

(Continued)

*Primary Examiner* — Stephen R Koziol
*Assistant Examiner* — Totam Le
(74) *Attorney, Agent, or Firm* — Patent Central LLC; Stephan A. Pendorf

(57) ABSTRACT

A method for environmental representation, in which two images of an environment (U) are taken respectively and a disparity image is determined by means of stereo image processing. An unobstructed free space (F) is identified in the disparity image, in that each pixel of the disparity image is allocated either to the unobstructed ground surface (B) or to one of several segments ($S_1^1$ to $S_n^u$) depending on disparity values of the respective pixel. Segments ($S_1^1$ to $S_n^u$) of the same width are formed from pixels of the same or similar distance to an image plane. An object (O1 to Ok) located outside of the free space (F) is modelled in the environment (U) using one segment ($S_1^1$ to $S_n^u$) or several segments ($S_1^1$ to $S_n^u$).

9 Claims, 1 Drawing Sheet

(56) References Cited

Figure 1:
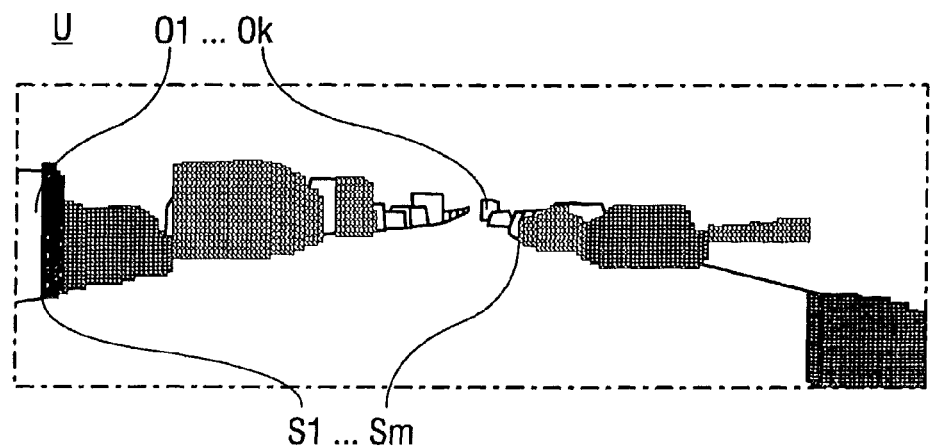

OTHER PUBLICATIONS (N. Suganuma, "Obstacle Detection Using Virtual Disparity Image for Non-Flat Road", 2008 IEEE Intelligent Vehcles Symposium).*

David Pfeiffer et al "Towards a Global Optimal Multi-Layer Stixel Representation of Dense 3D Data", Procedings of the British Machine Vision Conference 2011, Aug. 29, 2011, pp. 51.1-51.12, XP55060913, DOI: 10.5244/C.25.51, ISBN: 978-1-90-172543-8, the whole document.

"BMVC 2011 The 22nd British Machine Vision Conference—website", Aug. 29, 2011, XP55060915 Retrieved from the Internet: URL:http://www.computing.dundee.ac.uk/bmvc 2011 [retrieved on Apr. 24, 2013] the whole document.

David Gallup et al: "3D Reconstruction Using an n-Layer Heightmap", Sep. 22, 2010, Pattern Recognition, Springer Berlin Heidelberg, Berlin, Heidelberg, Germany, pp. 1-10, XP019153290, ISBN: 978-3-642-15985-5 cited in the appliation; the whole document.

David Pfeiffer et al "Efficient representation of traffic scenes by means of dynamic stixels", Intelligent Vehicles Symposium (IV), 2010 IEEE, IEEE, Piscataway, NJ, USA, Jun. 21, 2010, pp. 217-224, XP031732275, ISBN: 978-1-4244-7866-8; the whole document.

Hernan Badino et al: "The Stixel World—A Compact Medium Level Representation of the 3D-World", Sep. 9, 2009, Pattern Recognition: 31st Dagm Symposium, Jena, Germany, Sep. 9-11, 2009; Proceedings; [Lecture Notes in Computer Science; 5748], Springer Berlin Heidelberg, Berlin, Heidelberg, pp. 51-60, XP019127048, ISBN: 978-3-642-03797-9; the whole document.

Hirschmueller, Heiko."Accurate and Efficient Stereo Processing by Semi-Global Matching and Mutual Information" Institute of Robotics and Mechatronics Oberpfaffenhofen, Germany Aerospace Center (GLR), Wessling, Germany CVPR 2005, San Diego, CA, vol. 2 (Jun. 2005), pp. 807-814.

International Search Report PCT/EP2012/003091, May 6, 2013.

* cited by examiner

METHOD FOR REPRESENTING SURROUNDINGS

The invention relates to a method for environmental representation, in which two images of an environment are taken respectively and a disparity image is determined by means of stereo image processing.

A method for object detection is known from DE 10 2009 009 047 A1, in which two images of an environment are taken respectively and a disparity image is determined by means of stereo image processing. The disparity image is also referred to as a range image. A depth map of the environment is determined from the determined disparities, in which depth maps a free space boundary line is identified, which encloses a unobstructed region of the environment. The depth map is segmented outside and along the free space boundary line, in that segments of a suitable width are formed from pixels of the same or similar distance to an image plane. A height of each segment is estimated as a part of an object located outside an unobstructed region, such that each segment is characterized by the two-dimensional position of its base point, given by the distance and angle to the longitudinal axis of the vehicle, and its height. The disparity image and the depth map describe and represent the environment three-dimensionally.

The object of the invention is to specify an improved method for environmental representation compared to the prior art.

The object is solved according to the invention with a method which has the features specified in claim 1.

Advantageous embodiments of the invention are the subject matter of the sub-claims.

In a method for environmental representation, two images of an environment are taken respectively and a disparity image is determined by means of stereo image processing.

According to the invention, an unobstructed free space is identified in the disparity image, in that each pixel of the disparity image is allocated either to an unobstructed ground surface or to one of several segments depending on the disparity values of the respective pixel. Therein, segments of the same width are formed from pixels of the same or similar distance to a plane, wherein an object in the environment, located outside the free space, is modelled by means of a segment or several segments.

The three-dimensional environment described by the disparity image is approximated by the unobstructed free space. The free space is, for example, a navigable region, which does not, however, absolutely have to be planar. The free space is bordered by the rod-like segments, which model the objects surrounding the free space in their entirety. In the simplest case, these segments are on the ground and approximate an average height of the object in the region of the respective segment. Objects with variable height, for example cyclists from the side, are thus described by a piecewise constant height function.

The segments, which are also referred to as stixels, depict a compact and robust representation of the object and only require limited data volumes. Location and height are recorded for each stixel. This representation is suited, in a particularly advantageous way, to, if necessary, consecutive steps, such as object formation and scene interpretation. The stixel representation depicts an ideal interface between application-independent stereo analysis and application-specific evaluations.

The identification according to the invention of the unobstructed free space directly from the disparity images enables, in a particularly advantageous way compared to the prior art, an additional determination of a depth map to determine the free space to not be necessary. Thus, a processing expenditure is reduced and process-relevant resources can be saved. Furthermore, due to the identification of the free space directly from the disparity image, an optimal representation can be determined by global optimisation due to an error measure that is able to be defined flexibly.

Furthermore it results therefrom that each pixel is allocated to either the unobstructed ground surface or to a segment, and that several objects are registered in one image column or one image strip, such that the representation of the environment occurs completely without faults. Thus it is also possible to represent objects "in a second row". In other words: as not only the "most probable" objects are searched for, but rather all objects are taken into account, the risk does not exist that large background objects mask smaller and possibly significant objects in the disparity image.

Also, a probability of occurrence of false-positive stixels is significantly reduced by the method according to the invention in its entirety and an effective scope of the stereo analysis, i.e. the stereo image processing, is significantly increased. The increase lies, in particular, in a region from 50% to 100%. If an increase of the effective scope is not required, it is possible in a particularly advantageous way for a baseline width between the image capturing units capturing the two images to be able to be reduced, such that smaller installation spaces are required and design advantages can be achieved.

Exemplary embodiments of the invention are illustrated in greater detail by means of drawings.

Figure 2:
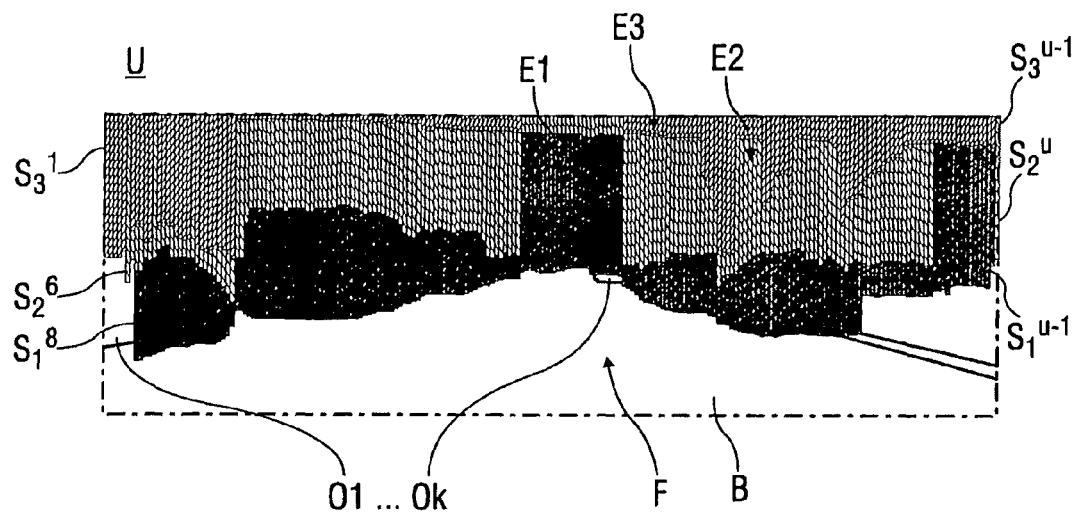

Here are shown:

FIG. 1 schematically, a two-dimensional depiction of an environment of a vehicle having an unobstructed free space and a number of segments for modelling objects in the environment according to prior art and FIG. 2 schematically, a two-dimensional depiction of an environment of a vehicle having an unobstructed free space and a number of segments for modelling objects in the environment according to the method according to the invention.

Parts that correspond to one another are provided with the same reference numerals in all figures.

In FIG. 1, a two-dimensional depiction of an environment U of a vehicle that is not shown having an unobstructed free space F and a number of segments S1 to Sm for modelling objects O1 to Ok in the environment U according to prior art is shown.

The segments S1 to Sm, also referred to as stixels, model the objects O1 to Ok, which are adjacent to the defined unobstructed free space F. To calculate the shown depiction, a method for object detection known from DE 10 2009 009 047 A1 is used.

Therein, firstly two images of the environment U are taken respectively and a disparity image is determined by means of stereo image processing. A depth map of the environment U is determined from the determined disparities.

A free space boundary line that is not depicted in more detail is identified, which surrounds the unobstructed free space F of the environment U. The depth map is segmented outside and along the free space boundary line, in that the segments S1 to Sm having a predetermined depth are formed from pixels of the same or similar distance to an image plane of an image capturing unit or several image capturing units. The image capturing units are cameras.

An approximation of the located free space boundary line in the segments S1 to Sm having any predetermined width, which are formed to be rod-like, supplies a distance between the segments S1 to Sm. In a known orientation of the image capturing unit to the environment U, as in the depicted example of a road before a vehicle on which the image capturing device is arranged, and a known three-dimensional course, a respective base point of the segments S1 to Sm results in the image.

Subsequently, a height of each segment S1 to Sm is estimated, such that each segment S1 to Sm is characterized by a two-dimensional position of a base point and its height.

The estimation of the height occurs in a dynamic programming by means of evaluation based on histograms of all three-dimensional points in the region of the respective segment S1 to Sm.

Regions that do not have segments S1 to Sm are those in which no objects O1 to Ok were located by the free space analysis.

It is disadvantageous for no segments S1 to Sm to be generated, if objects O1 to Ok that are small or at a greater distance are not detected in the analysis of the depth map. This results from small objects O1 to Ok, having a small number of disparity measurement values, only supplying a low signal strength, which is covered by the background noise.

Therefore the probability of detection of the objects O1 to Ok reduces with distance and "holes" occur in the so-called stixel world, as not every pixel can be allocated.

In the case that there are several objects O1 to Ok in one column of the depth map at a corresponding angle of vision, the algorithm decides the nearest of the objects O1 to Ok. In order to achieve robustness with regard to disturbances, an obviousness of the competing cells is evaluated. Therein a maximum of one segment S1 to Sm per column of the disparity image is possible, such that, disadvantageously, a restriction to one plane per column exists. In unusual cases that are however relevant in practice, a house, for example, can mask a fence located in front of this, such that this fence cannot be detected and thus is no longer able to be seen. As only the nearest object O1 to Ok is represented, partially covered objects O1 to Ok, such as for example a pedestrian situated behind a car, are not able to be represented.

Furthermore, the segments S1 to Sm must be on the ground surface B. This can lead to false interpretations with objects that protrude at a height.

Additionally, disturbances in the depth map can lead to false-positive segments S1 to Sm.

FIG. 2 shows a two-dimensional depiction of the same environment U as in FIG. 1, having an unobstructed free space F and a number of segments $S_1^1$ to $S_n^u$ for modelling the objects O1 to Ok in the environment U according to the method according to the invention.

By contrast with the method known from the prior art according to FIG. 1 according to DE 10 2009 009 047 A1, the step concerning the depth map is no longer necessary according to the method according to the invention.

Similarly to the method according to prior art, firstly two images of the environment U are taken respectively by means of the image capturing units and a disparity image is determined by means of stereo image processing. The image capturing units are cameras, but can also be formed as a photonic mixer device, a three-dimensional camera, lidar and/or radar. For example, the method described in "H. Hirschmüller: Accurate and efficient stereo processing by semi-global matching and mutual information. CVPR 2005, San Diego, Calif. Volume 2. (June 2005), pp. 807-814" can be used for the stereo image processing.

However, the unobstructed free space F is identified directly in the disparity image, in that each pixel of the disparity image is allocated either to the unobstructed ground surface B or to one of several segments $S_1^1$ to $S_n^u$ depending on disparity values of the respective pixel. The underlying geometric assumption is that, as a rule, there exists a staggering of the depths of the objects O1 to Ok in several planes E1 to En. This means that the possibility exists that several objects O1 to Ok can be depicted in one column of the disparity image. In order to be able to depict this staggering of depths, several segments $S_1^1$ to $S_n^u$ are arranged on top of one another in the relevant column of the disparity image according to the number of planes E1 to En in the respective column. Therein the index n indicates a segment number in the respective column of the disparity image and the index u, the so-called image column index, indicates the number of the respective column in the disparity image. In the depicted exemplary embodiment, the disparity image is divided into three planes E1 to E3.

Therein, the free space F is adjacent to the segments $S_1^1$ to $S_n^u$ that model the objects O1 to Ok. As each pixel is allocated, no "holes" result in the so-called stixel world. This means, as is shown in the depicted exemplary embodiment, all objects O1 to Ok in the environment U can be represented, wherein an effective scope of the stereo image processing is significantly increased, such that objects O1 to Ok that are at a greater distance can also be detected.

Herein, the segments $S_1^1$ to $S_n^u$ of the same width are formed from pixels of the same or similar distance to an image plane of the image capturing unit, by means of which the images are captured. Furthermore, the objects O1 to Ok are modelled outside the free space F by means of the segments $S_1^1$ to $S_n^u$. Each segment $S_1^1$ to $S_n^u$ is characterized therein by a two-dimensional position of a base point and its height. The segments $S_1^1$ to $S_n^u$ can also be arranged horizontally in a way that is not depicted in more detail, additionally or alternatively to the shown vertical arrangement.

In the case of the depicted arrangement of several segments $S_1^1$ to $S_n^u$ on top of one another in a column, a particularly precise analysis of a lower edge and an upper edge of the respective segment $S_1^1$ to $S_n^u$ is required. This means that the horizontal boundaries of the segments $S_1^1$ to $S_n^u$ are also determined as well as their vertical boundaries.

The horizontal and vertical boundaries of the segments $S_1^1$ to $S_n^u$ are determined by means of mathematical optimisation of an energy functional from the disparity values of the pixels. Therein, a quadratic energy functional is preferably used. This, however, is not absolutely necessary.

Particularly advantageously, dynamic programming is used for the mathematical optimisation, wherein adjacent columns are determined independently of one another in the dynamic programming. Due to the independent determination of the segments $S_1^1$ to $S_n^u$, it is a one-dimensional problem, which can be solved particularly efficiently by means of the dynamic programming. The dynamic programming is carried out, for example, according to "David Gallup, Marc Pollefeys and Jan-Michael Frahm: 3d reconstruction using an n-layer heightmap; In: Proc. DAGM, pages 1-10, September 2010".

In order to create a particularly significant representation of the environment U, various attributes are allocated to the segments $S_1^1$ to $S_n^u$. Herein, the allocation to determined object classes, grey value information and colour information of the respective pixel is taken into account in the functional movement information to be optimised. Furthermore, an allocation of the segments $S_1^1$ to $S_n^u$ to one or several objects O1 to Ok is determined and the segments $S_1^1$ to $S_n^u$ are provided with information about their allocation.

The movement information, which reflects a movement in the space, is preferably determined by the integration of an optical flow of the respective pixel and is allocated to each segment $S_1^1$ to $S_n^u$ as a movement vector, wherein for this purpose several disparity images are determined and processed sequentially and the optical flow is determined from changes in successive disparity images. Thus an actual movement is estimated for each of the segments $S_1^1$ to $S_n^u$. Corresponding methods are, for example, known from works on 6-D vision, which are published in DE 10 2005 008 131 A1. This movement information simplifies the grouping of objects O1 to Ok further, as compatible movements can be checked.

Due to the knowledge and the possibility of the processing of movement information, moved scenes can also be represented and, for example, be used to for the prediction of an expected movement of the objects O1 to Ok. This type of movement tracking is also known as tracking. Therein a spontaneous movement of a vehicle is determined to determine the movement of the segments $S_1^1$ to $S_n^u$ and is used for compensation. The compactness and robustness of the segments $S_1^1$ to $S_n^u$ results from the integration of many pixels in the region of the respective segment $S_1^1$ to $S_n^u$ and—using the tracking—from the additional integration over time.

The position of a base point of the respective segment $S_1^1$ to $S_n^u$, the height and the movement information of the segment $S_1^1$ to $S_n^u$ are preferably determined by means of the so-called scene flow. The scene flow is a type of method, which tries to determine for, if possible, each pixel, a correct movement in the space and its three-dimensional position from at least two successive stereo image pairs.

The segments $S_1^1$ to $S_n^u$ have clear proximity relations, whereby they allow themselves to be grouped to objects O1 to Ok very easily. In the simplest case, only distance and height are to be assigned to each segment $S_1^1$ to $S_n^u$. In the case of a known width of the segment $S_1^1$ to $S_n^u$, an angle, i.e. the column in the image, results form an index.

The depicted stixel world, which is a so-called multilayer stixel world, represents the geometric situation in the environment U and is also particularly suitable for further processing steps.

Therein, information for a driver assistance system in a vehicle can be generated on the basis of the identified segments $S_1^1$ to $S_n^u$, on which vehicle the image capturing units are arranged to take the images.

For example, an application for attention control or for planning in the case of automatically moved vehicles is possible with the aid of the determined free space F.

A remaining time until collision of the vehicle with an object represented by the segments $S_1^1$ to $S_n^u$ can also be estimated. Furthermore, a driving route can be set in the unobstructed region F, which should be used by the vehicle, wherein a lateral distance of at least one of the objects O1 to Ok to the driving route is determined.

Likewise, critical, in particular moved objects O1 to Ok for the support of a turning assistance system of automatic headlights, of a pedestrian protection system and of an emergency braking system are identified.

Additionally, information about further sensors is combined with the information to support the driver assistance system, which is allocated to the segments $S_1^1$ to $S_n^u$, as part of a sensor fusion. In particular, active sensors, for example a lidar, are possible for this.

LIST OF REFERENCE NUMERALS

B Ground surface
E1 Plane
E2 Plane
E3 Plane
F Free space
O1 to Ok Object
S1 to Sm Segment
S11 to Snu Segment
U Environment

The invention claimed is:

1. A method for environmental representation, in which two images of an environment (U) are taken respectively and a disparity image is determined by means of stereo image processing, comprising:
   identifying in the disparity image, an unobstructed free space (F) in that each pixel of the disparity image is allocated to either an unobstructed ground surface (B) or one of several segments ($S_1^1$ to $S_n^u$), wherein segments ($S_1^1$ to $S_n^u$) of the same width are formed from pixels of the same or similar distances to an image
   modeling an object (O1 to Ok) located outside of the free space (F) in the environment (U) via a segment ($S_1^1$ to $S_n^u$) or several segments ($S_1^1$ to $S_n^u$),
   wherein several segments ($S_1^1$ to $S_n^u$) are arranged on top of one another in one column of the disparity image respectively, if several objects (O1 to Ok) are depicted in different planes (E1 to E3) in one column of the disparity image.

2. The method according to claim 1, wherein lateral boundaries, a lower boundary and an upper boundary, are determined respectively as boundaries of the segments ($S_1^1$ to $S_n^u$).

3. The method according to claim 2, wherein the boundaries of the segments ($S_1^1$ to $S_n^u$) are determined by means of mathematical optimisation of an energy functional from the disparity values of the pixels.

4. The method according to claim 3, wherein a quadratic energy functional is used.

5. The method according to claim 3, wherein dynamic programming is used for the mathematical optimisation, wherein in the case of the dynamic programming, adjacent columns are determined independently of one another.

6. The method according to claim 2, wherein movement information, grey value information or colour information of the respective pixel is taken into account in the determination of the boundaries of the segments ($S_1^1$ to $S_n^u$).

7. The method according to claim 6, wherein several disparity images are determined and processed sequentially, wherein the movement information is determined from changes in successive disparity images by integration of an optical flow of the respective pixel and is allocated to each segment ($S_1^1$ to $S_n^u$) as a movement vector.

8. The method according to claim 1, wherein an allocation of the segments ($S_1^1$ to $S_n^u$) to one or several objects (O1 to Ok) is determined and the segments ($S_1^1$ to $S_n^u$) are provided with information about their allocation.

9. The method according to claim 1, wherein information for a driver assistance system in a vehicle is generated on the basis of the segments ($S_1^1$ to $S_n^u$), on which vehicle image capturing units are arranged to take the images.

* * * * *